(12) United States Patent
Barratt et al.

(10) Patent No.: US 7,606,257 B2
(45) Date of Patent: Oct. 20, 2009

(54) APPARATUS AND METHOD FOR TRANSMISSION COLLISION AVOIDANCE

(75) Inventors: Craig H. Barratt, Redwood City, CA (US); William J. McFarland, Los Altos, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 980 days.

(21) Appl. No.: 10/760,024

(22) Filed: Jan. 15, 2004

(65) Prior Publication Data

US 2005/0157744 A1  Jul. 21, 2005

(51) Int. Cl.
*H04L 12/413* (2006.01)
*H04L 12/43* (2006.01)

(52) U.S. Cl. ...................... 370/445; 370/458
(58) Field of Classification Search ................... 370/445
See application file for complete search history.

(56) References Cited

U.S. PATENT DOCUMENTS

| | | | | | |
|---|---|---|---|---|---|
| 4,560,985 | A | * | 12/1985 | Strecker et al. | 370/447 |
| 5,355,375 | A | * | 10/1994 | Christensen | 370/407 |
| 5,742,239 | A | * | 4/1998 | Siloti | 370/448 |
| 6,408,341 | B1 | * | 6/2002 | Feeney et al. | 709/250 |
| 6,678,252 | B1 | | 1/2004 | Cansever | |
| 6,963,549 | B1 | * | 11/2005 | Jayaraman et al. | 370/328 |
| 2002/0167961 | A1 | * | 11/2002 | Haartsen | 370/444 |
| 2002/0181492 | A1 | * | 12/2002 | Kasami et al. | 370/445 |
| 2003/0099221 | A1 | * | 5/2003 | Rhee | 370/338 |
| 2003/0108059 | A1 | * | 6/2003 | Yew et al. | 370/443 |
| 2003/0115369 | A1 | * | 6/2003 | Walter et al. | 709/253 |
| 2003/0137993 | A1 | * | 7/2003 | Odman | 370/468 |
| 2003/0198206 | A1 | * | 10/2003 | Cain et al. | 370/337 |
| 2004/0165562 | A1 | * | 8/2004 | Elaoud et al. | 370/338 |
| 2004/0233924 | A1 | * | 11/2004 | Bilak et al. | 370/412 |
| 2004/0264423 | A1 | * | 12/2004 | Ginzburg et al. | 370/338 |
| 2005/0064817 | A1 | * | 3/2005 | Ginzburg | 455/41.2 |
| 2005/0122989 | A1 | * | 6/2005 | Ginzburg et al. | 370/445 |

FOREIGN PATENT DOCUMENTS

| JP | 11261518 A | * | 9/1999 |
|---|---|---|---|
| WO | WO 03/019798 A2 | | 3/2003 |
| WO | WO 2004/040778 A2 | | 5/2004 |

* cited by examiner

*Primary Examiner*—Pankaj Kumar
*Assistant Examiner*—Hicham B Foud
(74) *Attorney, Agent, or Firm*—Bever, Hoffman & Harms, LLP; Jeanette S. Harms

(57) ABSTRACT

A method of minimizing collisions in a CSMA/CA wireless data communication system using an access point includes sensing the presence of a client desirous of communication with the access point. A start time slot list having at least one unique start time slot during which the client may begin transmitting can be allocated. The start time slot list to the client can be transmitted. A transmission from the client can be received, wherein such transmission begins only during the start time slot(s) indicated by the start time slot list. Notably, the start time slot list can include a high-priority start time slot and a low-priority start time slot substantially equally displaced in time from a center start time slot. A client capable of receiving the start time slot list can select between the high-priority start time slot and the low-priority start time slot based on a randomizing function.

4 Claims, 6 Drawing Sheets

APPARATUS AND METHOD FOR TRANSMISSION COLLISION AVOIDANCE

BACKGROUND OF THE INVENTION

1. Field of the Invention

The present invention relates to digital wireless communication systems. More particularly, the invention relates to communications transmission medium collision avoidance and preemption control.

2. Background of the Related Art

Extant digital wireless communication systems communicate on a single RF channel, as exemplified by transceivers including access points (APs) and clients (also called, "nodes") compliant with the IEEE-802.11-1999 standard. Since only one device may make use of the transmission medium (in the instant example, a single RF communication channel) at any one time without destructive interference, a coordinating mechanism for reducing collisions (two entities transmitting contemporaneously) is codified in section 9.2.4 of the above-referenced standard. The fundamental access method of the IEEE 802.11 MAC is a Distributed Coordination Function (DCF) known as carrier sense multiple access with collision avoidance (CSMA/CA). Devices using this access method listen to the communication medium and detect a period of inactivity prior to transmitting.

The approach taught in the standard is to create an array of available transmission start time slots and, upon detecting a transition from a busy state to a clear channel state having the transmitting entities transmit or retransmit beginning in a randomly selected slot selected from the array. If collisions occur multiple times, the array size is doubled until a maximum is reached. The behavior of such a system is described in the standard as stable and fair (providing equal transmission medium access) for heavily loaded systems.

Much growth has occurred in in-home wireless local area networks (WLANs). Such localized systems are unlikely to ever require the relief offered by §9.2.4 of the above-referenced IEEE-802.11 specification. Indeed, the mechanism therein described will impose a modest penalty on such systems by creating an opportunity for inadvertent collision which must, then, be resolved in a manner that decreases throughput.

There are also situations, for example in Voice over IP (VoIP) applications, where a guaranteed bit stream transmission is required that should be afforded an unequal and higher priority than that afforded by the egalitarian technique defined by §9.2.4 of the above-referenced IEEE-802.11 specification.

There is thus a need in the art for a method and system for avoiding wasteful collision resolution in extant wireless data communication systems in a manner that retains the fundamental "fairness" of the intent of §9.2.4 of the above-referenced IEEE-802.11 specification. There is, further, a need to optionally set a priori preemptive transmission priorities, a feature not addressed by the above-referenced IEEE-802.11 specification.

SUMMARY OF THE INVENTION

In view of the above deficiencies of the available art, it is an object of the invention to provide an apparatus and method for avoiding transmission collisions on a shared communication medium (e.g., an RF channel) by allocating a subset of transmission start time slots to cooperatively equipped transceivers.

It is another object of the invention to provide the advantages of fixed transmission start time slots in a manner that permits deterministic preemption by higher priority transceivers.

It is yet another object of the invention to provide the advantages of fixed, transmission time slots in a manner that enforces non-colliding equal access priority to the transmission medium by a plurality of cooperatively equipped transceivers.

The above objects and other advantages are achieved according to a first aspect of the present invention by providing enhanced transceivers, each having an array of pre-assigned transmission start time slots that comprise one or more subsets of available transmission time slots.

According to another aspect of the invention, providing an enhanced access point capable of producing a list of time slots during which each cooperatively equipped client associated with the access point may begin to transmit without encountering interfering transmissions from similarly cooperatively equipped clients. Start time slots are assigned on a first-come, first-served basis.

According to still another aspect of the invention, these objects are achieved by providing a priority value associated with each client. The priority value may be sent to the access point which, in turn, creates a start time slot list that allows transmission of higher-priority traffic earlier than lower priority traffic. Since the presence of a signal in the RF channel signals any other emitter to wait until the channel is clear before transmitting, this has the effect of allowing a higher-priority transmitter to effectively preempt transmission by lower priority stations.

According to another aspect of the invention, these objects are achieved by creating "pools" of transmit start time slots. The "pools" may be pre-assigned or dynamically assigned according to a class of traffic (data) to be transmitted. In this approach, similar traffic may be assigned transmission start time slots from pools of relatively equal priority. Devices may further select start time slots from a plurality of pools according to the class of traffic being handled by a particular transmissible data packet. Pools of slots may also advantageously be assigned to AP traffic and node traffic, thus ensuring no collisions between an AP and its nodes, even when the node count exceeds the number of slots in the node pool. In that case, collisions could only occur between similarly-pooled nodes. A pool of more than one AP slot has the further advantage of mitigating co-channel interference between APs operating in differing basic service sets (BSSs) in physical proximity.

According to yet another aspect of the invention, these objects are achieved by creating start time slot lists for clients that contain both early and late transmit slots. Slots that occur earlier in time will preempt more transmissions and are thus higher in priority than later slots. These transmit start time slots may be distributed equally about a temporal center. By selecting randomly between early ("H" high priority branch) or late ("L" low priority branch) time slots, non-colliding equal priority channel access is achieved.

According to a further aspect of the invention, it is desirable for cooperatively equipped communicating devices to interoperate with devices compliant with existing standards.

BRIEF DESCRIPTION OF THE DRAWINGS

These and other objects, features and advantages of the present invention are better understood by reading the following detailed description of a preferred embodiment, taken in conjunction with the accompanying drawings, in which.

DETAILED DESCRIPTION OF PRESENTLY PREFERRED EXEMPLARY EMBODIMENTS

Figure 1:
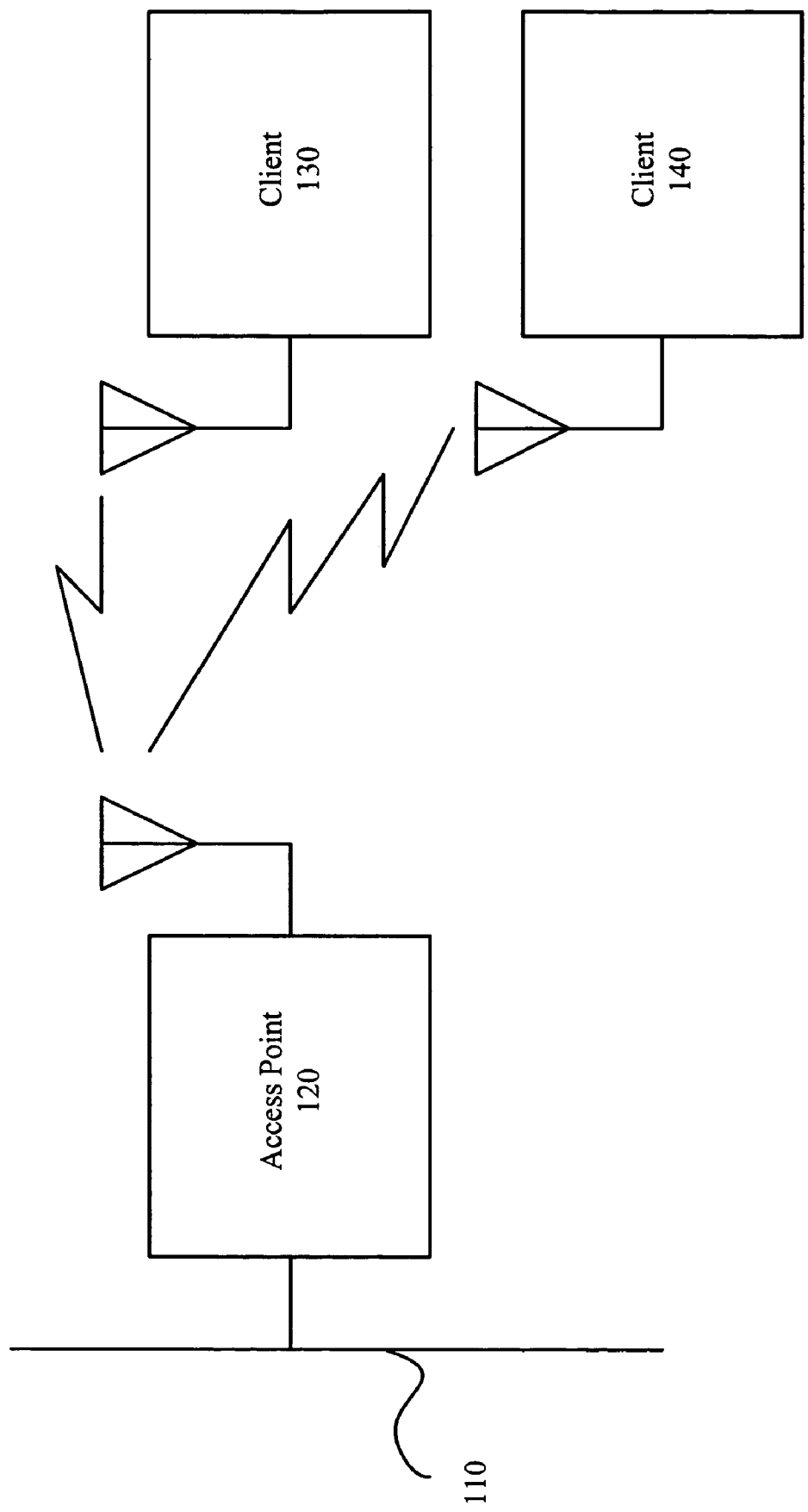
FIG. 1 is a block diagram of a digital communication system showing an access point 120 coupled to a network 110 and communicating with clients 130 and 140.

FIG. 1 shows an access point 120 connected to a fixed network 110 and connected wirelessly to clients 130 and 140. If access point 120 and clients 130 and 140 are cooperatively equipped devices, optimal benefit will be derived from the instant invention. Each of the wireless devices 120, 130 or 140 can be functional as set forth in the above-referenced IEEE-802.11-1999 standard.

Figure 2:
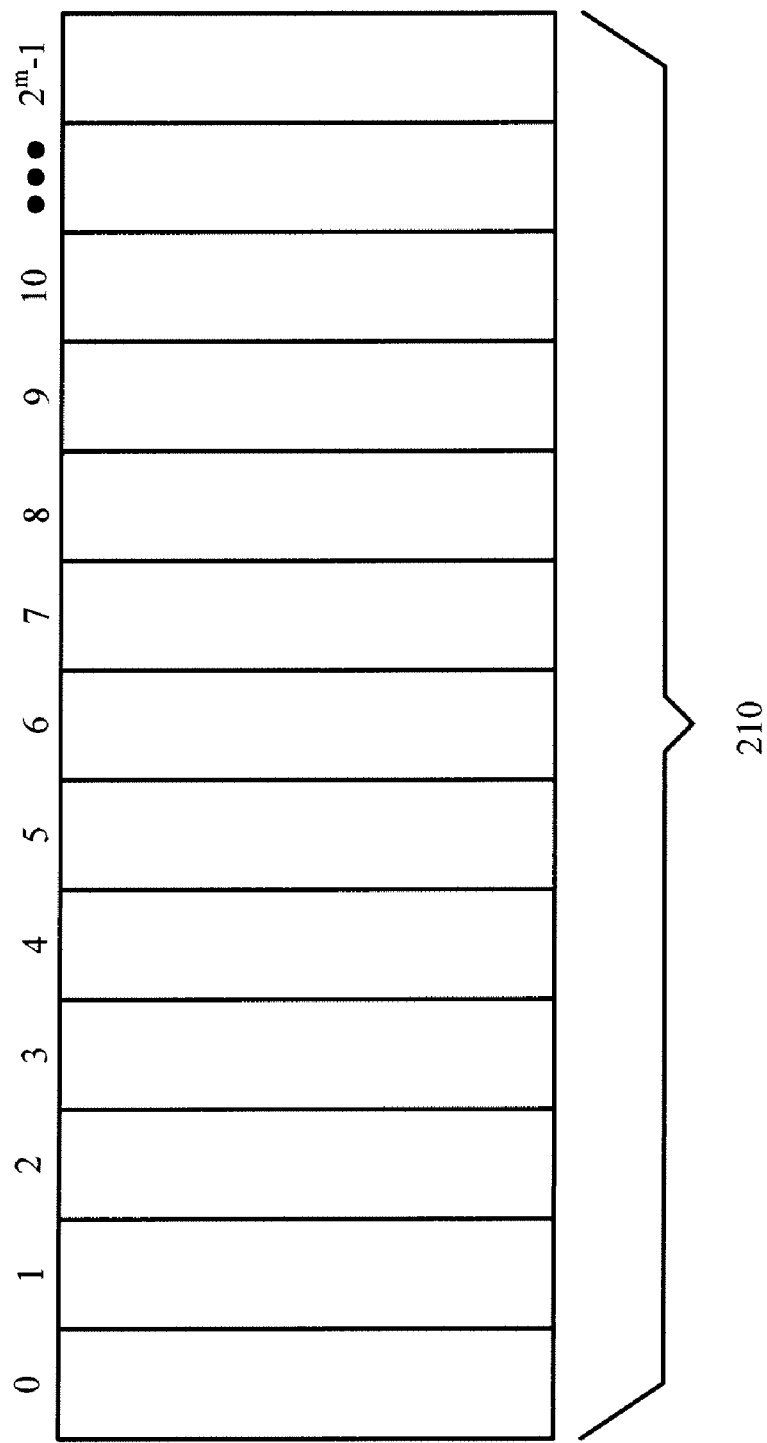
FIG. 2 is a representation of the array of prior art, standards-compliant time slots for after-collision retransmission 210.

FIG. 2 shows the available combination of randomly-selected transmit start time slots 210 prescribed by §9.2.4 of the above-referenced IEEE-802.11 standard. The standard prescribes the random selection of a slot amongst those in the array described by the equation:

"Backoff Time=Random( )×aSlotTime."

Figure 3:
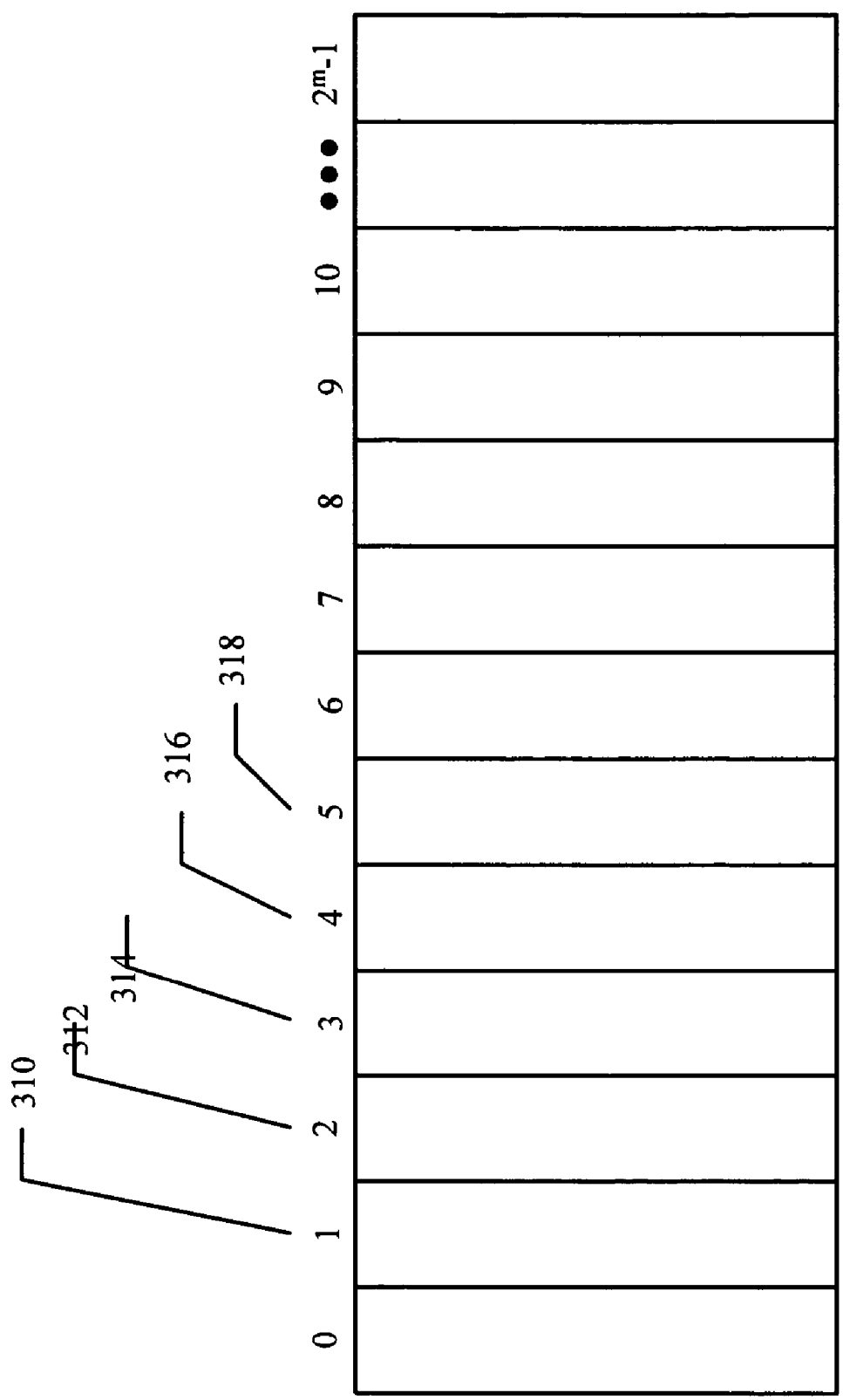
FIG. 3 is a representation of an array of unique, non-colliding time slots suitable for allocation amongst a number of cooperatively equipped clients.

FIG. 3 shows one embodiment of the instant invention wherein an array of transmit start time slots 310, 312, . . . 318 are assigned by an access point in first-come, first-served order. This has the effect of arbitrarily assigning variable transmit priority to clients. In an alternative embodiment, time slot 310 is assigned to the highest-priority transmitter since all other transmitters will be waiting for their later-occurring times to begin to transmit. If slot 310 is used, then all other transmitters will sense activity on the transmit medium and hold off transmitting until their time to transmit occurs and the channel is not active. Priority is established by means of a client reporting a priority value to the access point. In yet another embodiment, priority is established by analysis of communications traffic. In still another embodiment, access points are assigned a first fixed subset of transmit start times and clients are assigned a second fixed subset of transmit start times. In one embodiment, the first and second fixed subsets of transmit start times are disjoint. In other embodiments, the subsets of transmit start times may be adjusted by means of a user interface. In further embodiments, start time slots may be selected from fixed or assigned pools of slots reflecting a priority afforded a class of traffic (e.g., VoIP). In one embodiment, two pools may be created, one pool reserved for AP use, the other for node use. The AP pool may be assigned every even numbered slot and the node pool is assigned every odd numbered slot.

Notably, there may be more nodes than there are node slots in a pool. In this case, collisions are restricted to occurring between nodes and not with an AP.

Figure 4:
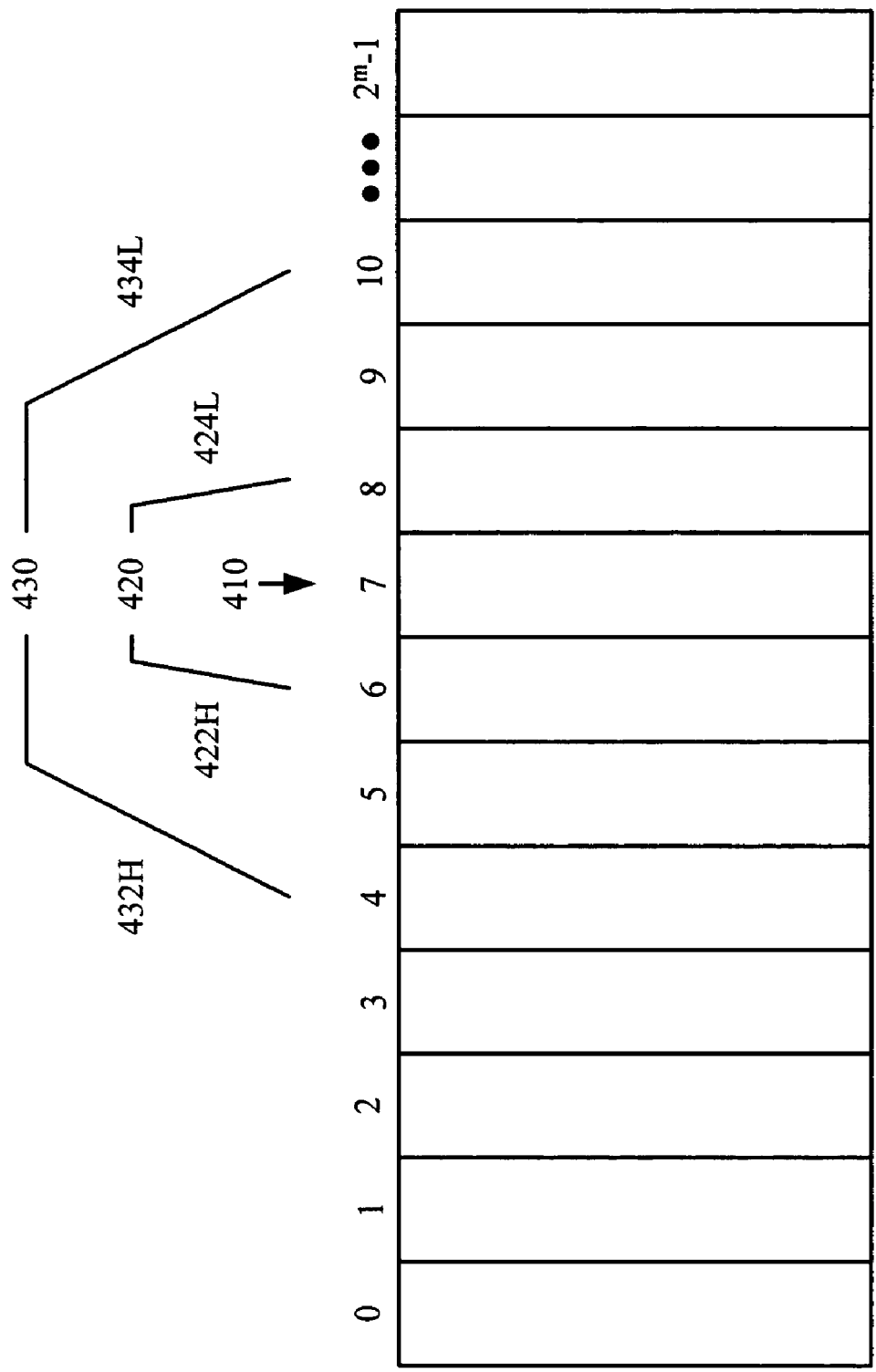
FIG. 4 is a representation of an array of pairs of unique, non-colliding time slots suitable for allocation amongst a number of cooperatively equipped clients that exhibit a temporal center.

FIG. 4 shows another preferred embodiment wherein pairs of high (H) and low (L) priority slots are assigned to clients such that each pair of start time slots 420, 430 is substantially equally displaced in time about a center slot 410. In this configuration, a client assigned slot pair 420 is required to randomly select between the H 422 and L 424 branches respectively. A second client would similarly be assigned H and L slot pair 432 and 434.

This configuration has the advantage of assuring equal preemption since channel activity serves to prevent transmission. For any pair of start time slots, the pair whose members are most distant in time from the center slot will have a 50% chance of always winning or always losing to another ready-to-transmit entity. This configuration assures statistically equal access to the shared communications medium.

Figure 5:
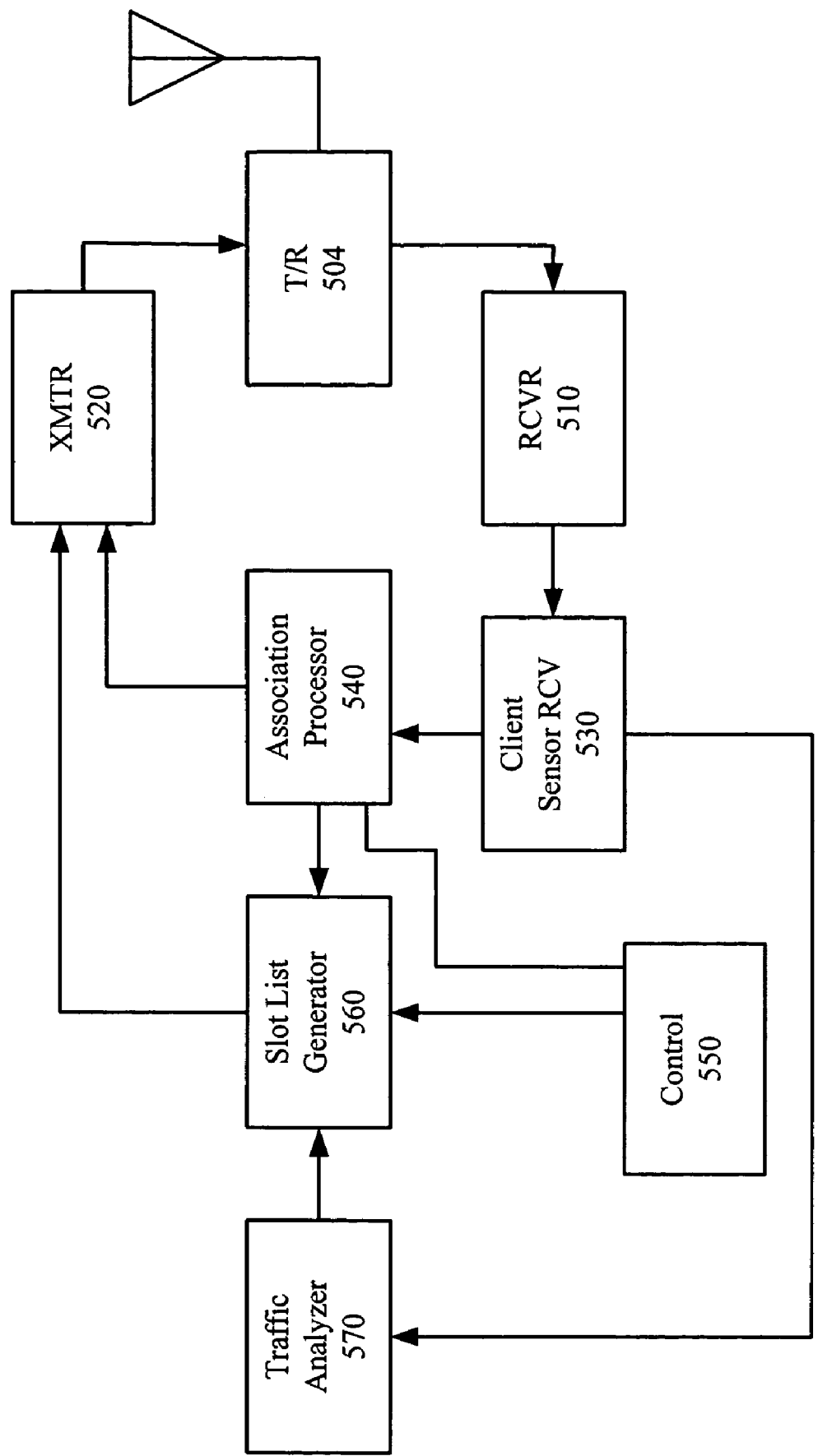
FIG. 5 shows a block diagram of a wireless access point according to the instant invention.

FIG. 5 is a block diagram of an access point according to the instant invention. A receiver 510 receives signals from transmit/receive switch (T/R) 504 and is coupled to a client request sensor 530. The request sensor 530 is coupled to an association processor 540. In some embodiments the association processor 540 serves the purpose specified in §11.3 of the IEEE-802.11-1999 specification for wireless LANs. An association request is made by a client seeking to open communications with, for example, an access point. The association processor 540 and slot list generator 560 functions may be controlled or modified by controller 550. In some embodiments, controller 550 is expressed as software. The presence of a cooperatively equipped client is communicated to slot list generator 560. The slot list generator 560 can generate a slot list according to any of the first-come, first served, prioritized according to communicated priority, prioritized in response to traffic analyzer 570, selected from a pool of slots associated with a class of transmission or the slot-pair equal preemption method referenced above. In some embodiments, the slot list processor is expressed as software. In some embodiments, the class of transmission is set statically. In other embodiments, traffic analyzer 570 may indicate a class of transmission. The creation of such software is well within the grasp of one skilled in the art to which the present invention pertains.

Figure 6:
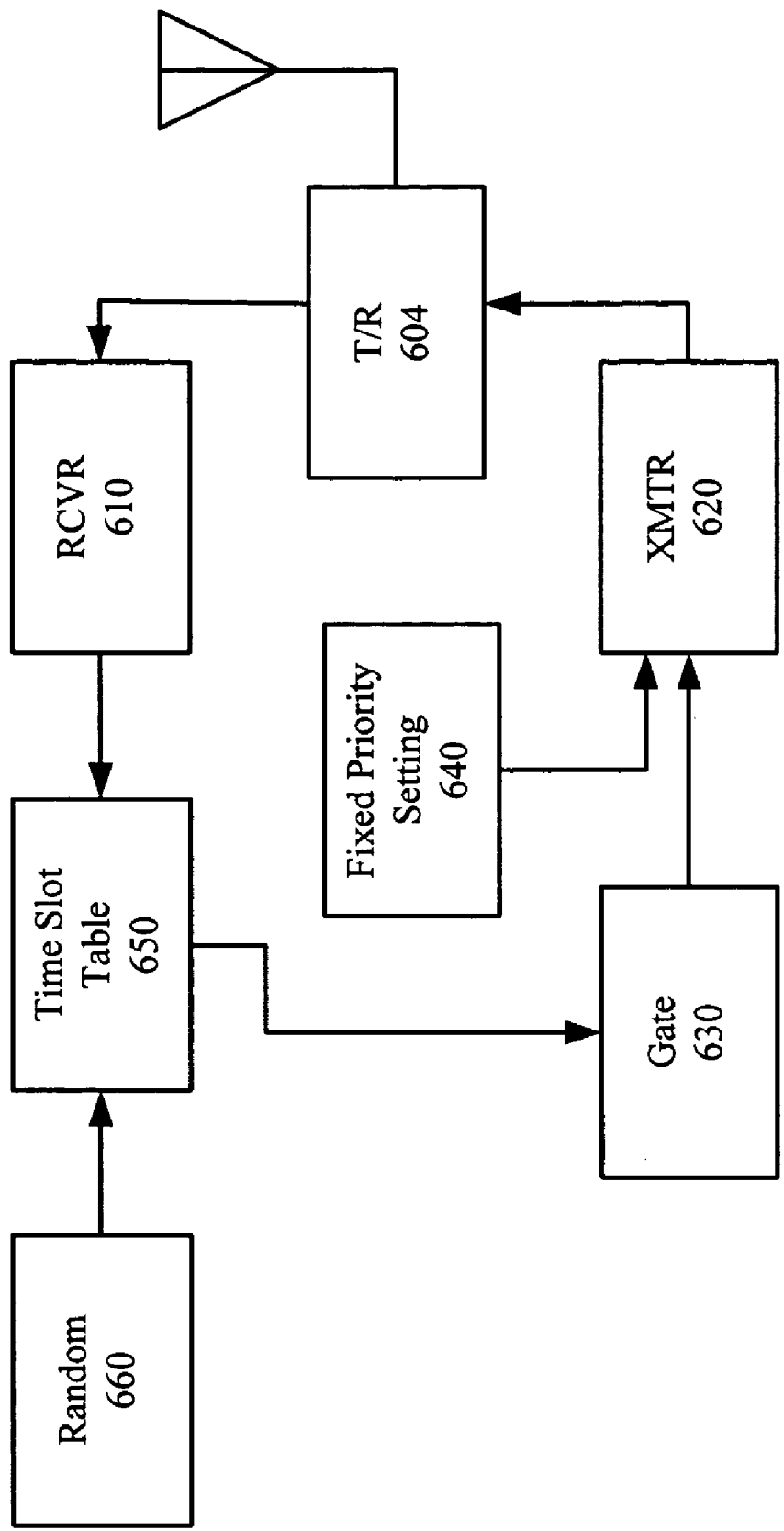
FIG. 6 shows a block diagram of a wireless client according to the instant invention.

FIG. 6 shows a block diagram of a client according to the instant invention. A transmitter 620 sends, through transmit/receive switch (T/R) 604 an association request to an access point. In some embodiments the association request to §11.3 of the IEEE-802.11-1999 specification for wireless LANs. The association request may, in one embodiment, carry fixed priority data provided by fixed priority setting 640. Receiver 610 receives a start time slot list which is stored in start time slot table 650. Start time slot table 650 can be addressed by random value generator 660. The output of the start time slot table 650, as indexed by random value generator 660, is coupled to a transmit gate 630 which serves to allow the transmitter to be active only during the start time slot received from table 650.

It is a goal of the instant invention to interoperate with devices that are compliant with existing standards. Such devices expect to operate in an environment defined, by way of example and not limitation, by §9.2.4 of the above-referenced IEEE-802.11-1999 standard. When a collision occurs as a result of legacy operation within a WLAN formed primarily of cooperatively equipped clients and access points, the time slot table may have to be doubled (up to a predefined maximum). In some embodiments, each cooperatively equipped device may expand its existing time slot table by substantially replicating the time slot table, ensuring similar non-colliding interoperation with all but the legacy device. In other embodiments, similarly prioritized pools of slots may be created where the number of slots may be doubled, but each pool may be grown in relative proportion to its original proportion to the total number of original slots. In other embodiments, expansion of an existing time slot table may be performed responsive to a count of sensed clients. In some embodiments, clients may expand their time slot tables responsive to a command from an AP. In yet other embodiments, cooperatively equipped clients may expand their time slot tables autonomously.

A similar situation can arise if the number of cooperatively equipped transceivers becomes sufficiently large and unique transmission time slot table assignments cannot be made or in the event static time slot allocations are not unique. When a collision occurs, the transmission time slot table is doubled in size (up to a predefined maximum) and the contents of the transmission time slot table are expanded as described, above.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A method of minimizing collisions in a CSMA/CA wireless data communication system using an access point, the method comprising:
    sensing the presence of a client desirous of communication with the access point;
    allocating a start time slot list having at least one unique start time slot during which the client may begin transmitting;
    transmitting the start time slot list to the client; and
    receiving a transmission from the client, the transmission beginning only during the start time slot(s) indicated by the start time slot list,
    wherein allocating includes:
    assigning in the start time slot list at least one pair of a high-priority start time slot and a low-priority start time slot substantially equally displaced in time from a center start time slot.

2. A method of minimizing collisions in a CSMA/CA wireless data communication system using an access point, the method comprising:
    sensing the presence of a client desirous of communication with the access point;
    allocating a start time slot list having at least one unique start time slot during which the client may begin transmitting;
    transmitting the start time slot list to the client; and
    receiving a transmission from the client, the transmission beginning only during the start time slot(s) indicated by the start time slot list,
    wherein the start time slot list includes a high-priority time slot and a low-priority time slot substantially equally displaced in time from a center time slot.

3. A client for receiving the start time slot list of claim 2, the client selecting between the high-priority start time slot and the low-priority start time slot based on a randomizing function.

4. An access point that minimizes collisions in a CSMA/CA wireless data communication system, the access point comprising:
    a client sensor for detecting the presence of a client desirous of communication with the access point;
    a start time slot allocator for allocating a start time slot list having one or more unique start time slots during which the client may begin to transmit;
    an access point transmitter for transmitting the start time slot list to a client receiver; and
    an access point receiver for receiving a transmission from the client, the transmission being received only during the start time slot(s) indicated by the start time slot list,
    wherein the start time slot allocator comprises:
    a start time slot generator for generating at least one pair of a high-priority time slot and a low-priority start time slot in the start time slot list, the high-priority time slot and the low-priority start time slot substantially equally displaced in time from a center start time slot.

* * * * *